(12) United States Patent
Vitale et al.

(10) Patent No.: US 11,226,627 B2
(45) Date of Patent: Jan. 18, 2022

(54) SYSTEM FOR MODIFYING A SPOT LOCATION

(71) Applicant: Caterpillar Global Mining LLC, Oak Creek, WI (US)

(72) Inventors: Andrew J. Vitale, Edwards, IL (US); Bryan J. Everett, Washington, IL (US); Mark H. Banham, Victoria Point (AU); Craig L. Koehrsen, East Peoria, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 393 days.

(21) Appl. No.: 16/447,268

(22) Filed: Jun. 20, 2019

(65) Prior Publication Data
US 2020/0401141 A1 Dec. 24, 2020

(51) Int. Cl.
*G01C 22/00* (2006.01)
*G05D 1/00* (2006.01)
*G05D 1/02* (2020.01)
*E02F 3/43* (2006.01)
*E02F 9/20* (2006.01)

(52) U.S. Cl.
CPC ............ *G05D 1/021* (2013.01); *E02F 3/435* (2013.01); *E02F 9/205* (2013.01); *G05D 2201/0202* (2013.01)

(58) Field of Classification Search
CPC . G05D 1/021; G05D 2201/0202; E02F 3/435; E02F 9/205
USPC .......................................................... 701/24
See application file for complete search history.

(56) References Cited

U.S. PATENT DOCUMENTS

| 8,965,622 | B2 | 2/2015 | Ozaki et al. |
| 9,037,338 | B2 | 5/2015 | Osagawa et al. |
| 9,568,322 | B2 | 2/2017 | Sugihara et al. |
| 10,048,692 | B2 | 8/2018 | Hamada et al. |
| 10,761,537 | B1* | 9/2020 | Ready-Campbell ......... G05D 1/0246 |
| 2014/0350801 | A1* | 11/2014 | Bonefas ................. B60R 11/04 701/50 |
| 2017/0315561 | A1 | 11/2017 | Kadono et al. |
| 2018/0073208 | A1 | 3/2018 | Wilson et al. |
| 2018/0118204 | A1* | 5/2018 | Ito .......................... G08G 1/165 |
| 2019/0194913 | A1* | 6/2019 | Petrany .................... E02F 9/265 |
| 2020/0139967 | A1* | 5/2020 | Beller .................. B60W 30/165 |

FOREIGN PATENT DOCUMENTS

| WO | WO-2017198222 A1 * | 11/2017 | ............... G05D 1/02 |
| WO | WO 2018/155709 A1 | 8/2018 | |
| WO | WO 2015/151359 A1 | 10/2019 | |

OTHER PUBLICATIONS

English Translation for WO2017198222A1 (Year: 2021).*

* cited by examiner

*Primary Examiner* — Mahmoud S Ismail
(74) *Attorney, Agent, or Firm* — Leydig, Voit & Mayer, Ltd.

(57) ABSTRACT

A system for moving material from a first location to a second location includes a planning system to identify an initial spot location. A perception sensor is configured to generate perception signals indicative of whether an obstacle is in the path between a material carrying machine and the initial spot location. An alternate spot location is determined if an obstacle is in the path and a propulsion command is generated to move the material carrying machine from the current pose to the alternate spot location.

20 Claims, 5 Drawing Sheets

SYSTEM FOR MODIFYING A SPOT LOCATION

TECHNICAL FIELD

This disclosure relates generally to controlling machines and, more particularly, to a system and method for autonomously modifying a spot location of a machine in view of obstacles in a path of the machine.

BACKGROUND

Machines are used for moving material between locations at a work site. For example, rope shovels, mining shovels, hydraulic shovels, and hydraulic excavators may move material using rotational movement while material carrying machines such as haul truck may be used to move by driving along a path or road. Machines using such rotational capabilities may dig material with a material engaging work implement at a dig site and rotate the work implement to a dump or truck load site at which the work implement is dumped or unloaded into a material carrying machine such as a haul truck. The material carrying machine may then be propelled to another location such as a truck dump site at which the material is dumped or discharged from the machine.

The process of moving material may be repeated numerous times over the course of a desired time period. The machines may operate in an autonomous, semi-autonomous, or manual manner to perform these tasks in response to commands generated as part of a work plan for the machines. When operating autonomously or semi-autonomously, the work plan may be generated by a planning system that designates the dig and dump or truck load locations.

When moving large amounts of material in repeated material moving cycles, material may be dumped or displaced along undesired areas. Such undesired material may adversely affect the performance of the material movement cycles, either by impacting a digging, or truck loading operation, or by disrupting a desired route or path along which a machine may travel. When operating manually, an operator may be able adjust for such undesired material. However, such adjustments are more complex when operating autonomously or semi-autonomously.

Systems have been developed to redirect haul trucks away from obstacles during a loading operation. U.S. Pat. No. 10,048,692 discloses a vehicle travel system for guiding an autonomously operated haulage vehicle when operated in conjunction with a loading machine. The system permits an operator of the loading machine to identify obstacles and redirect the haulage vehicle to avoid the obstacle based upon the position of the loading machine, the position of the work implement, and the position of an obstacle.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In a first aspect, a system for changing a spot location while moving material from a first location to a second location at a work site includes a ground engaging drive mechanism, a truck pose sensor, a perception sensor, and a controller. The ground engaging drive mechanism is configured to propel a material carrying machine along a ground surface at the work site. The truck pose sensor is configured to generate truck pose signals indicative of a pose of the material carrying machine. The perception sensor is configured to generate perception signals indicative of an environment at the work site. The controller is configured to store an obstacle threshold for the material carrying machine, determine an initial spot location for the material carrying machine, and determine a current pose of the material carrying machine based upon the truck pose signals. The controller is further configured to determine a path between the material carrying machine and the initial spot location based upon the current pose of the material carrying machine, determine a topography of the path between the material carrying machine and the initial spot location based upon the perception signals from the perception sensor, with the topography identifying at least one obstacle in the path, determine an alternate spot location if the at least one obstacle in the path between the material carrying machine and the initial spot location exceeds the obstacle threshold, with the alternate spot location being based upon a position of the at least one obstacle, and generate a propulsion command to move the material carrying machine from the current pose to the alternate spot location.

In another aspect, a method of changing a spot location while moving material at a work site from a first location to a second location includes, storing an obstacle threshold for a material carrying machine, determining an initial spot location for the material carrying machine, determining a current pose of the material carrying machine based upon truck pose signals from a truck pose sensor. The method further includes determining a path between the material carrying machine and the initial spot location based upon the current pose of the haul truck, determining a topography of the path between the haul truck and the initial spot location based upon perception signals from a perception sensor, with the topography locating at least one obstacle in the path, determining an alternate spot location if the at least one obstacle in the path between the material carrying machine and the initial spot location exceeds the obstacle threshold, with the alternate spot location being based upon a position of the at least one obstacle, and generating a propulsion command to move the material carrying machine from the current pose to the alternate spot location.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1:
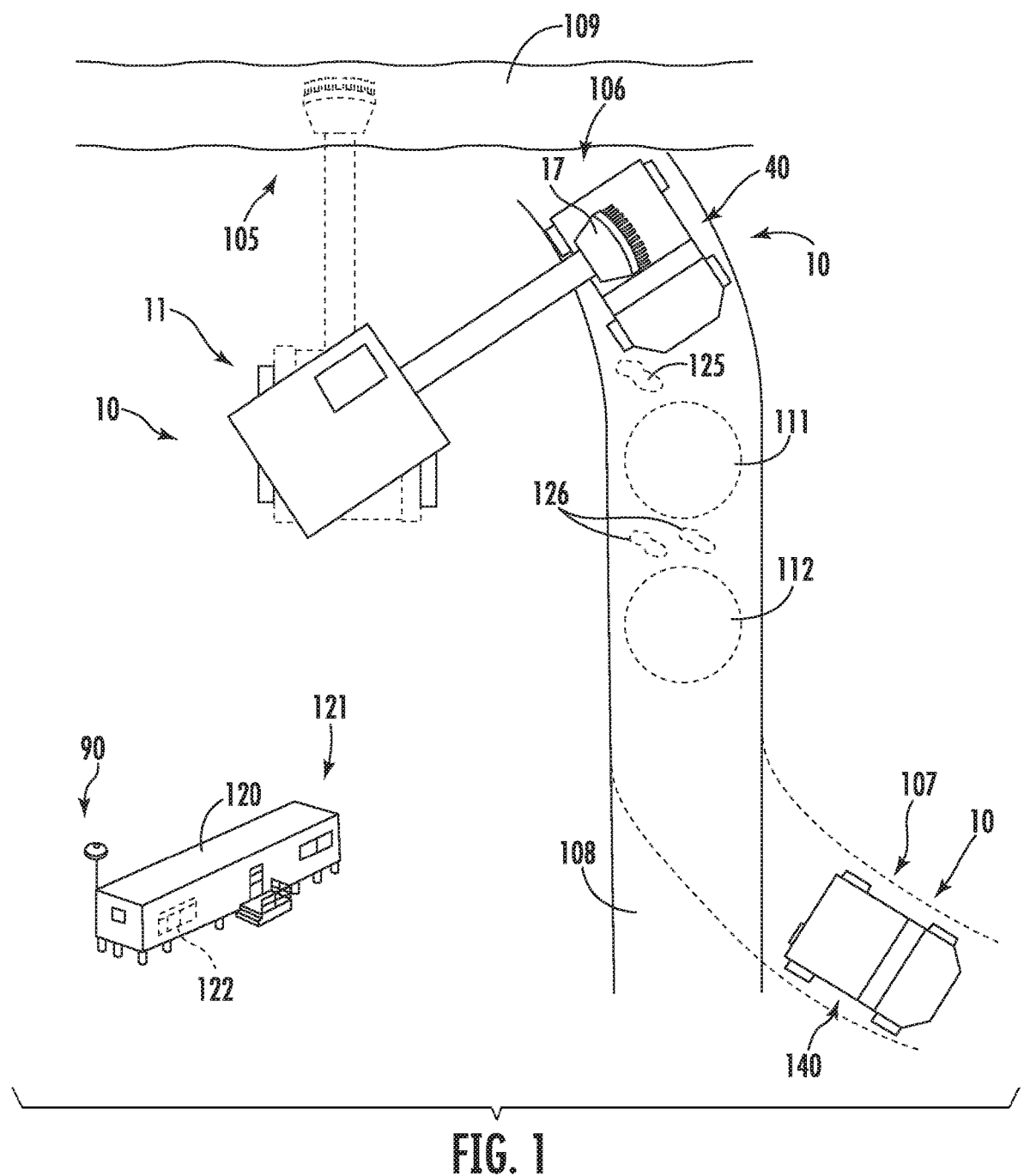
FIG. 1 depicts a diagrammatic illustration of a work site at which the principles disclosed herein may be used.

Referring to FIG. 1, a portion of an exemplary work site 100 is depicted at which a plurality of mobile machines 10 may operate in an autonomous, a semi-autonomous, or a manual manner. The work site 100 may be portion of, for example, a mine site, a landfill, a quarry, a construction site, a road work site, or any other type of work site. The machines 10 may perform any of a plurality of desired operations or tasks at the work site 100 such as excavating earthen material from a dig site and loading it onto a nearby target. As depicted, the work site 100 includes a material loading machine, such as a hydraulic shovel 11, used to load material at a loading site onto a plurality of machines such as haul trucks 40. After each haul truck 40 is filled to a desired level at a load location, the haul truck 40 may travel to a dump location before returning to be filled again. A command center 120 may be located at the work site 100 or at another location remote from the work site 100.

Figure 2:
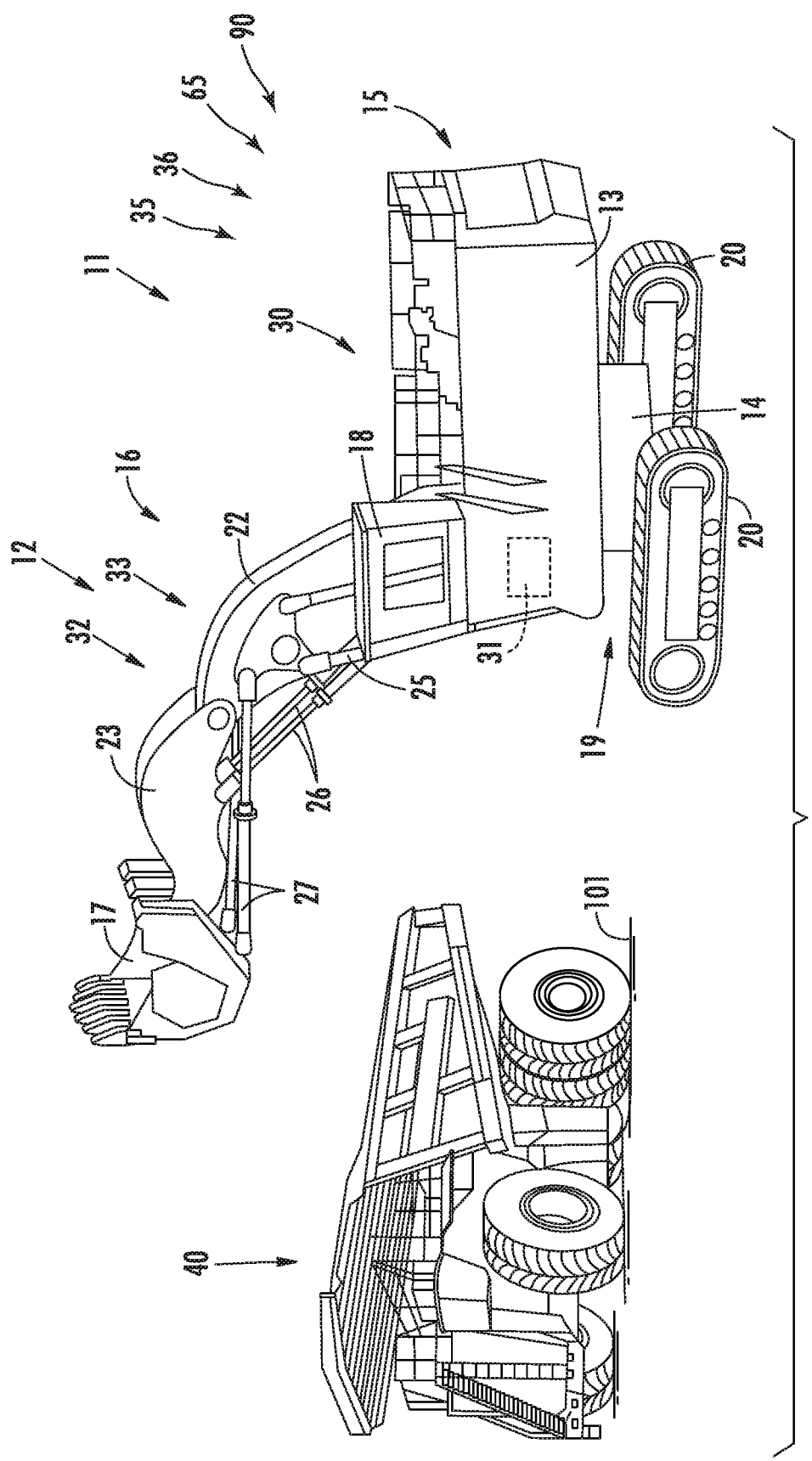
FIG. 2 depicts a perspective view of a loading machine and a haul truck operating at the work site of FIG. 1.

Referring to FIG. 2, the hydraulic shovel 11 has multiple systems and components that cooperate to move material in a desired manner. The hydraulic shovel 11 may include an implement system 12 comprising a swing member or platform 13, an undercarriage 14, and a linkage assembly 16 including a material engaging work implement configured as a bucket 17. The platform 13 may be rotatably disposed on the undercarriage 14 and may include an operator station 18 from which an operator may control some or all of the operations of the hydraulic shovel 11. Rotation of the platform 13 relative to the undercarriage 14 may be effected by a swing motor indicated generally at 19.

The undercarriage 14 may be a structural support for one or more traction devices 20 configured as ground engaging tracks operative to allow translational motion of the hydraulic shovel 11 across a ground surface 101 and thus permit the implement system 12 to be a movable implement system. Alternatively, the traction devices 20 may be configured as wheels, belts, or other traction devices known in the art.

A prime mover generally indicated at 15 may provide power for the operation of the hydraulic shovel 11. In one embodiment, the prime mover 15 may embody a combustion engine, such as a diesel engine, a gasoline engine, or any other type of combustion engine known in the art. The prime mover 15 may alternatively embody a non-combustion source of power, such as an electrical source including a fuel cell or a power storage device such as a battery coupled to a motor. The prime mover 15 may provide a rotational output to drive the traction devices 20, thereby propelling the hydraulic shovel 11. The prime mover 15 may also provide power to other systems and components of the hydraulic shovel 11.

The linkage assembly 16 may include one or more linkage members configured to move the bucket 17. In one example, the linkage assembly 16 may include a boom member 22 and connecting member such as a stick member 23. A first end of the boom member 22 may be pivotally connected to the platform 13, and a second end of the boom member may be pivotally connected to a first end of the stick member 23. The bucket 17 may be pivotally or movably connected to a second end of stick member 23.

Each linkage member may include and be operatively connected to one or more actuators such as hydraulic cylinders. More specifically, the boom member 22 may be propelled or moved along a path by one or more boom hydraulic cylinders 25. The stick member 23 may be propelled by stick hydraulic cylinders 26. Rotation of the bucket 17 relative to the stick member 23 may be effected by work implement hydraulic cylinders 27. The linkage members may translate or rotate in a plane that is generally orthogonal to the ground surface 101. Other types of actuators are contemplated such as electric motors, pneumatic motors, or any other actuation devices.

The hydraulic shovel 11 may include and be controlled by a shovel control system 30 as shown generally by an arrow in FIG. 2 indicating association with the machine. The shovel control system 30 may include an electronic control module or controller such as a shovel controller 31 that controls the operation of various aspects of the hydraulic shovel 11 including the drivetrain and the hydraulic systems.

The shovel controller 31 may be an electronic controller that operates in a logical fashion to perform operations, execute control algorithms, store and retrieve data and other desired operations. The shovel controller 31 may include or access memory, secondary storage devices, processors, and any other components for running an application. The memory and secondary storage devices may be in the form of read-only memory (ROM) or random access memory (RAM) or integrated circuitry that is accessible by the shovel controller 31. Various other circuits may be associated with the shovel controller 31 such as power supply circuitry, signal conditioning circuitry, driver circuitry, and other types of circuitry.

The shovel controller 31 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the shovel controller 31 may be implemented in hardware and/or software without regard to the functionality. The shovel controller 31 may rely on one or more data maps relating to the operating conditions and the operating environment of the machine 10 and the work site 100 that may be stored in the memory of or associated with the shovel controller. Each of these data maps may include a collection of data in the form of tables, graphs, and/or equations.

The shovel control system 30 and the shovel controller 31 may be located on the hydraulic shovel 11 or may also include components located remotely from the hydraulic shovel such as on any of the other machines 10 at the work site 100 or at the command center 120. The functionality of shovel controller 31 may be distributed so that certain functions are performed on the hydraulic shovel 11 and other functions are performed remotely. The operating characteristics and kinematics of the hydraulic shovel 11 may be stored within or accessed by the shovel controller 31 or any other controller such as the remote controller 122.

The shovel control system 30 may include a plurality of sensors that provide data indicative (directly or indirectly) of various operating parameters of the machine and/or the operating environment in which the machine is operating. The term "sensor" is meant to be used in its broadest sense to include one or more sensors and related components that may be associated with the hydraulic shovel 11 and that may cooperate to sense various functions, operations, and operating characteristics of the machine and/or aspects of the environment in which the machine is operating.

An implement system pose sensing system 32, as shown generally by an arrow in FIG. 2 indicating association with the hydraulic shovel 11, includes an implement system pose sensor as shown generally at 33 to sense the position and orientation (i.e., the heading, pitch, roll or tilt, and yaw) of the implement system 12 relative to the work site 100. The position and orientation are sometimes collectively referred to as the pose. The implement system pose sensor 33 may include a plurality of individual sensors that cooperate to generate and provide pose signals to the shovel controller 31 indicative of the position and orientation of the implement system 12.

In one example, the implement system pose sensor 33 may include one or more sensors that interact with a positioning system such as a global navigation satellite system or a global positioning system to operate as a pose sensor. In another example, the implement system pose sensor 33 may further include a slope or inclination sensor such as a pitch angle sensor for measuring the slope or inclination of the implement system 12 relative to a ground or earth reference. The shovel controller 31 may use the implement system pose signals from the implement system pose sensor 33 to determine the pose of the implement system 12 within work site 100. In other examples, the implement system pose sensor 33 may include an odometer or another wheel rotation sensing sensor, a perception based system, or may use other systems such as lasers, sonar, or radar to determine all or some aspects of the pose of implement system 12.

In an embodiment, the implement system pose sensor 33 may include first pose sensor for determining the position of an aspect of the hydraulic shovel, such as the platform 13 or the undercarriage 14, together with a plurality of angle sensors (not shown) located near one or more joints of the linkage members (i.e., the boom joint between the platform 13 and the boom member 22, the stick joint between the boom member 22 and the stick member 23, and the implement joint between the bucket 17 and the stick member 23). In some instances, the overall position of the hydraulic shovel 11 may be determined as a function of the undercarriage 14. In such case, the plurality of angle sensors may include an angle sensor to determine the relative angle between the platform 13 and the undercarriage 14. The angle sensors may include inertial measurement units, rotary encoders, potentiometers, or other angle or sensing devices for measuring the relative angular position of components.

In an alternate embodiment, the angle sensors may measure the displacement of an actuator and the joint angles may be calculated based upon the position of the actuators and the dimensions of the linkage members. Regardless of the type of the angle sensors, the shovel controller 31 may use output signals from the angle sensors to determine the position of each linkage member and the bucket 17 relative to the platform 13 and/or undercarriage 14.

The positions of the components of the hydraulic shovel 11 including the implement system 12 may be determined based upon the kinematic model of the machine together with the dimensions of the platform 13, undercarriage 14, boom member 22, stick member 23, and bucket 17, as well as the relative positions between the various components. More specifically, the shovel controller 31 may include a data map that identifies the position of each component of the hydraulic shovel 11 based upon the relative positions between the various components. The shovel controller 31 may use the position of the platform 13 and/or undercarriage 14 together with the dimensions and the positions of the various components to determine the position of each component of the hydraulic shovel 11 relative to the work site 100. Further, the shovel controller 31 may use the position of the platform 13 and/or undercarriage 14 together with the dimensions and the positions of the various components to generate and store therein a three-dimensional electronic map of the machine 10 at the work site 100.

A perception system generally indicated at 35 may be disposed or mounted on the hydraulic shovel 11. The perception system 35 may include one or more systems such as an optical system (e.g., a camera system), a thermal or infrared imaging system, a radar system, a LIDAR system, and/or any other desired system that operates with associated perception sensors indicated generally at 36 to determine the range and direction to objects.

The perception sensors 36 (e.g., such as one or more cameras) may generate perception signals or data that is received by the shovel controller 31 or the remote controller 122 and may be used to determine the topography of the ground surface 101 as well as the position of obstacles at the work site 100 as described below. To do so, the perception system 35 may be used to generate an electronic map and/or images of the work site 100.

Figure 3:
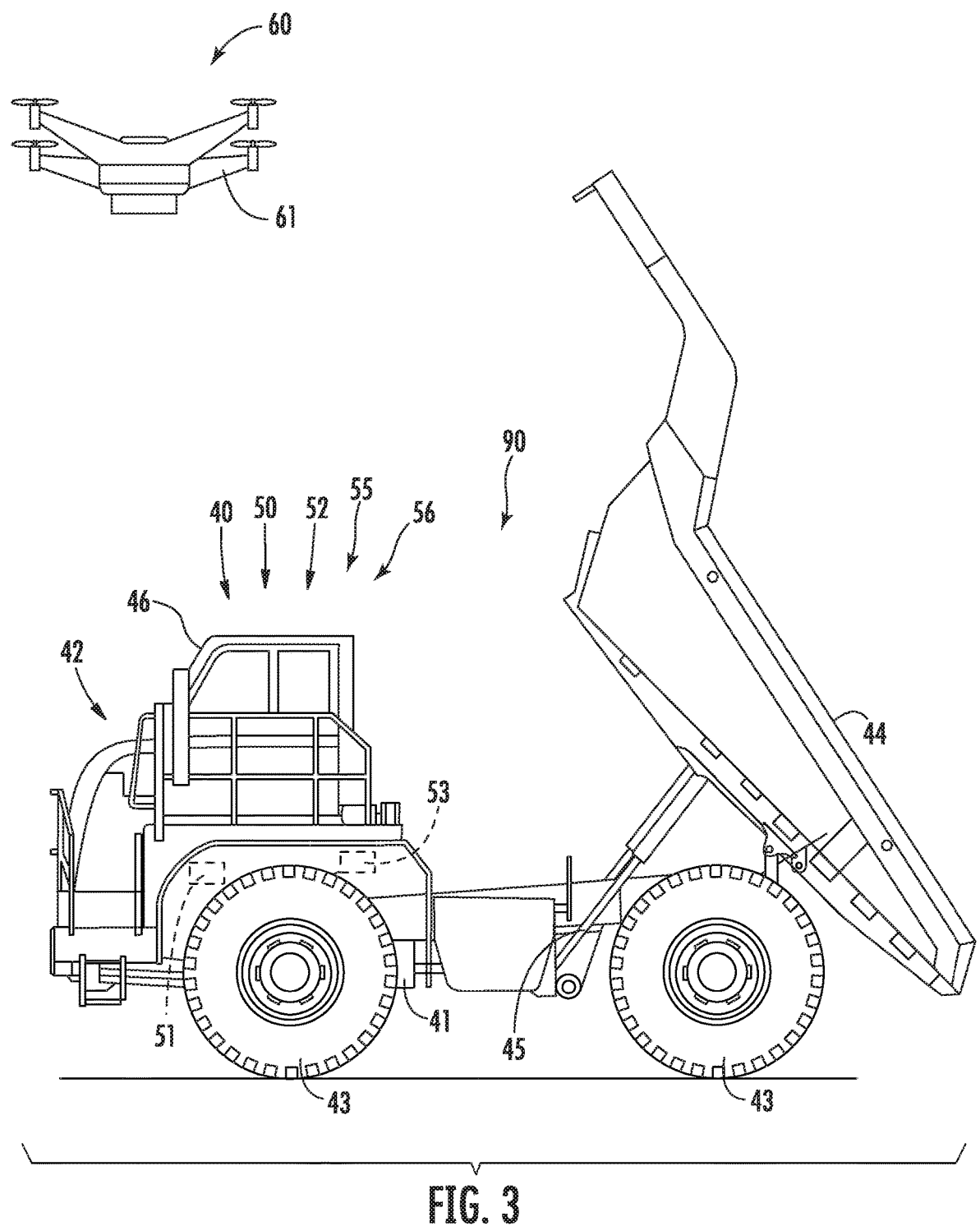
FIG. 3 depicts a side view of the haul truck of FIG. 2.

Referring to FIG. 3, a diagrammatic illustration of a material carrying machine such as a haul truck 40 for hauling or transporting material is depicted. The material carrying machine may have any configuration including a haul truck, an articulated truck, or any other machine configured to move or carry material. The haul truck 40 includes a frame 41, and a prime mover such as engine 42 operatively connected to a ground engaging drive mechanism such as drive wheels 43 to propel the machine. The haul truck 40 may use any type of machine propulsion and drivetrain mechanisms including hydrostatic, electric, or a mechanical drive.

A payload container or dump body 44 may be pivotally mounted on frame 41 and configured to carry material. Actuators such as hydraulic cylinders 45 may extend between the frame 41 and the dump body 44 that operate to dump material within the dump body as desired.

The haul truck 40 may include a cab 46 that an operator may physically occupy and provide input to control the machine. Cab 46 may include one or more input devices (not shown) through which the operator may issue commands to control the propulsion and steering of the machine as well as dump the dump body 44.

The haul truck 40 may include and be controlled by a truck control system 50 as shown generally by an arrow in FIG. 3 indicating association with the machine. The truck control system 50 may include an electronic control module or controller such as a truck controller 51 that controls the operation of various aspects of the haul truck 40 including the drivetrain and the hydraulic systems. The truck control system 50 and the truck controller 51 may be identical or similar in structure and operation to the shovel control system 30 and the shovel controller 31 described above and their descriptions are not repeated herein.

The truck control system 50 and the truck controller 51 may be located on the haul truck 40 and may also include components located remotely from the haul truck such as on any of the other machines 10 at the work site 100 or at the command center 120. The functionality of truck controller 51 may be distributed so that certain functions are performed on the haul truck 40 and other functions are performed remotely. Operating characteristics such as the turning radius and payload capabilities of each haul truck 40 may be stored within or accessed by the truck controller 51 or any other controller such as shovel controller 31.

The truck control system 50 may include a plurality of sensors indicated generally that provide data indicative (directly or indirectly) of various operating parameters of the machine. As stated above with respect to the hydraulic shovel 11, the term "sensor" is meant to be used in its broadest sense to include one or more sensors and related components that may be associated with the haul truck 40.

The plurality of sensors of haul truck 40 may include a haul truck pose sensing system as shown generally at 52 indicating association with the truck, includes a truck pose sensor 53 to sense the position and orientation of the truck relative to the work site 100. The haul truck pose sensing system 52 may be identical or similar in some respects to the implement system pose sensing system 32 described above and the truck pose sensor 53 may be identical or similar in some respects to the implement system pose sensor 33 described above and thus the descriptions thereof are not repeated herein. The truck pose sensor 53 may comprise a plurality of individual sensors that cooperate to generate and provide truck pose signals to the truck controller 51 indicative of the pose of the haul truck 40 relative to the work site 100.

The truck control system 50 may also include a perception system 55 including perception sensors indicated generally at 56 configured to determine the position of obstacles at the work site 100 in a manner similar or identical to the perception system 35 and the perception sensors 36 of the hydraulic shovel 11.

In another embodiment, a distinct or separate perception system indicated generally at 60 may alternatively or additionally be provided that includes a plurality of perception sensors separate from the hydraulic shovel 11 and the haul truck 40 such as sensors mounted on a mobile machine or device including a drone or unmanned aerial vehicle 61 (FIG. 3). Data from the separate perception system 60 may be transmitted to the hydraulic shovel 11, the haul truck 40, or another system remote from the machines wirelessly or in a wired manner. In one embodiment, the unmanned aerial vehicle 61 having a perception system 60 may be tethered (physically or virtually) to one of the hydraulic shovel 11 or the haul truck 40 to provide perception data to the machine along a wired or wireless connection.

The hydraulic shovel 11 and the haul trucks 40 operating at the work site 100 may be configured to be operated autonomously, semi-autonomously, or manually. In case of semi-autonomous or manual operation, the machines may be operated by remote control and/or by an operator physically located within their cab. If a machine is configured to operate via a remote control system, a visual image system (not shown) such as a camera system may be provided for generating visual images indicative of a point of view relative to the machine. The visual image signals may be transmitted wirelessly through the wireless communications system 90 to a system remote from the machines.

Figure 4:
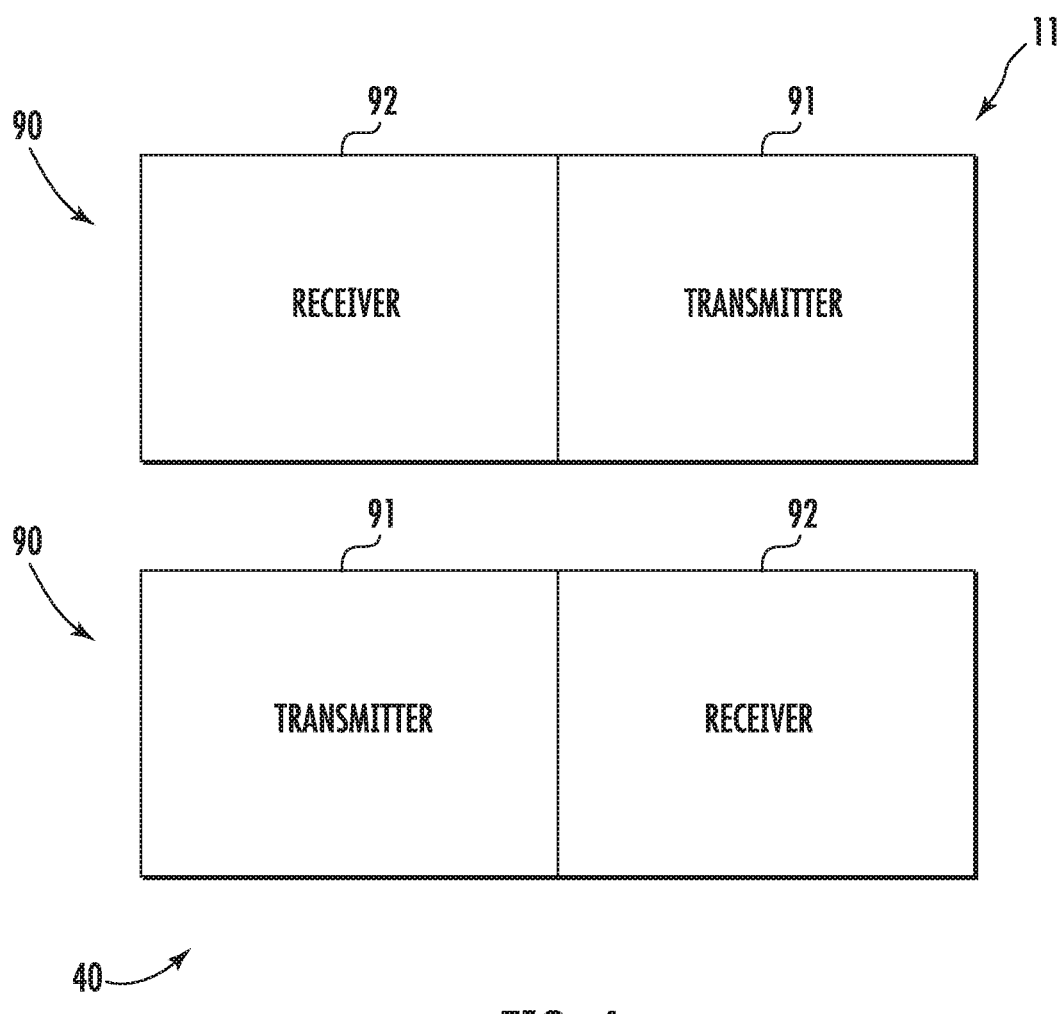
FIG. 4 depicts a diagrammatic illustration of a wireless communications system.

Each of the shovel control system 30 and the truck control system 50 may include a wireless communications system 90 (FIG. 4) to permit wireless transmission of instructions, information, and data between the machines 10 as well as between each of the machines and a command center 110. In an embodiment, each wireless communications system 90 may include a transmitter 91 for transmitting signals from one wireless communications system and a receiver 92 for receiving signals from a transmitter system of another wireless communications system. In another embodiment, the transmitter 91 and the receiver 92 may be combined as a transceiver system.

The wireless communications systems 90 may be configured as short range machine-to-machine or peer-to-peer communications system that include components that permit the machines to send and receive signals directly to and from other machines over a relatively short distance without the need for a network node remote from the machines. In the alternative, the wireless communications system may be configured to permit communication between machines and systems through remote communications systems.

Inasmuch as operations performed at the work site 100 and by the hydraulic shovel 11 and the haul truck 40 may be planned or controlled by any of the shovel control system 30, the truck control system 50, or a remote control system indicated generally at 121 in FIG. 1 at the command center 120, or any combination thereof, as well as the shovel controller 31, the truck controller 51, or a remote controller 122 associated with the remote control system 121, or any combination thereof, references herein to systems and operations of the control system and/or the controller may refer to systems and operations of any of the shovel control system 30, the truck control system 50, or the remote control system 120, or any combination thereof, as well as the shovel controller 31, the truck controller 51, or the remote controller 122, or any combination thereof.

A module or planning system, indicated generally at 65 in FIG. 2, may be provided as part of or associated with the shovel control system 30 for determining or planning various aspects of a material moving operation. The planning system 65 may utilize various types of inputs from the sensors associated with the hydraulic shovel 11 as well as the electronic map of the work site 100 including the configuration of the ground surface, the position of the hydraulic shovel, the position and movement of any obstacles adjacent the hydraulic shovel, desired or proposed dig location(s), desired or proposed load locations(s), and the characteristics of the material to be moved. Capabilities and desired operating characteristics of the hydraulic shovel 11 as well as its kinematic model may also be stored by shovel controller 31 and used by the planning system 65. The planning system 65 may simulate and evaluate any aspect of a material moving operation, such as by evaluating and then selecting (or provide feedback regarding when operating manually) a plurality of potential dig locations, potential load locations, and/or potential paths between a dig location and a load location that creates the most desirable results based upon one or more criteria.

The planning system 65 may be utilized regardless of whether the hydraulic shovel 11 is being operated autonomously, semi-autonomously, or manually. When operating the hydraulic shovel 11 autonomously or semi-autonomously, the planning system 65 may determine, and the shovel controller 31 may generate, commands to direct the bucket 17 to the desired location or in a desired manner such as by controlling the rotation of the platform 13 relative to the undercarriage 14. When operating the hydraulic shovel 11 manually, the planning system 65 may evaluate and provide suggestions for dig locations, load locations, and the paths therebetween.

Referring back to FIG. 1, in an exemplary material moving operation, after selecting the dig location 105, the load location 106, and the path therebetween, a material dig command may be generated so that the bucket digs into material and is loaded at the dig location 105. A rotate command is generated and the bucket 17 is moved into alignment with a haul truck 40 located at the load location 106 and the material dumped from the bucket into the haul truck. This process may be repeated until the haul truck 40 is filled to a desired extent.

In an embodiment, a waiting or next haul truck 140 may be located at a staging area 107 while waiting for a haul truck 40 to be completely filled and exit the load location 106 exiting along a road or path 108. Upon the current haul truck 40 leaving the load location 106 and exiting along the path 108, the next haul truck 140 is propelled (manually or autonomously) to the load location where it is filled by the hydraulic shovel 11.

In some instances, however, the ground surface 101 along which the haul trucks 40 travel may change over time due to material falling or being displace onto the ground surface 101 such as from the bucket 17, off the dump body 44 of the haul trucks 40, off other machines, from the face 109 at the work site 100, or from any other location. Material that has fallen onto the ground surface 101 may block the path or a portion of the path between the staging area 107 and the desired load location 106 set by the planning system 65 and thus prevent the haul truck 40 from traveling directly to the load location.

More specifically, the material displaced onto the ground surface 101 may result in piles of material 125 being located adjacent the load location 106 or along or in the path 108. Upon exceeding an obstacle threshold, such piles of material may constitute or define an obstacle that a haul truck 40 cannot pass. In one example of an obstacle threshold, upon reaching a threshold height, a pile of material 125 may be sufficiently tall so that a haul truck 40 cannot traverse the pile. However, if the pile of material 125 exceeds the threshold height but the path 108 is sufficiently wide so that the haul truck 40 is able to pass around the pile of material, such pile of material may not define an obstacle. It should be noted that even if one type of haul truck 40 cannot pass a pile of material 125 due to its operating characteristics, such as its turning radius, ground clearance, or width, another haul truck having different characteristics may be able to pass over or around the pile of material without exiting the designated road or path 108. In such case, the pile of material 125 may define an obstacle for one haul truck but not another.

In another example, a pile of material 126 may not exceed the threshold height but may be sufficiently close to another pile of material 126 so that each of the piles of material constitute or define an obstacle that a haul truck 40 cannot traverse. As a result, the distance between the piles of material may further define an obstacle threshold.

In order to adjust the material loading process as a result of material that has fallen on the ground surface 101 and may block the path between the staging area 107 and the load location 106 set by the planning system, a supplemental planning system 66 may be provided that utilizes perception data from one or more of the perception systems to generate a new load location that is more readily accessible to the haul truck 40 to be filled. In an embodiment, the truck controller 51 may receive perception data from the perception sensors 56 of the haul truck 40 and determine whether any obstacles are blocking the path from the staging area 107 to the desired or planned load location 106. If a sufficient amount of material is blocking the path (i.e., defining an obstacle), the truck controller 51 may generate an alternate load location based on the position and kinematics of the hydraulic shovel 11, the dig location 105, the position and operating characteristics of the haul truck 40, and the topography of the ground surface 101.

In the example depicted in FIG. 1, a first obstacle in the form of the pile of material 125 is disposed immediately adjacent the original load location 106 and towards the staging area 107. This pile of material 125 will prevent the next haul truck 140 at the staging area from reaching the original planned load location 106. After receiving perception data from the perception sensors 56 of the haul truck 40, the truck controller 51 may determine that the path to the planned load location 106 is either blocked.

In such case, the supplemental planning system 66 may plan an alternate or substitute load location. In some instances, the supplemental planning system 66 may be configured as a portion of the truck control system 50. The truck controller 51 may receive, directly or indirectly, such as from the shovel controller 31 or from a remote system the position of the hydraulic shovel 11. The truck controller 51 may have stored therein or access the kinematics and operating characteristics of the hydraulic shovel 11 and thus, based upon the combination of the position, kinematics, and characteristics of the shovel, the supplemental planning system 66 may determine or generate alternate load locations to which the hydraulic shovel may be able to dump the contents of bucket 17.

In an embodiment, the supplemental planning system 66 may be configured to select the alternate load location that is closest to the previously planned load location 106. In another embodiment, the supplemental planning system 66 may be configured to select the alternate load location that is closest to the dig location 105. In still another embodiment, the supplemental planning system may be configured to select the alternate load location that is closest to the current position of the haul truck 40. In a further embodiment, the alternate load location 111 may be based upon a distance and/or position from the previously planned load location. In some instances, this configuration may be useful when information regarding the hydraulic shovel 11 (e.g., kinematics, operating characteristics, dig location 105, etc.) is not known by the supplemental planning system 66. Other manners of selecting alternate load locations are contemplated as would be understood by one skilled in the art.

In the example depicted in FIG. 1, the pile of material 125 defines an obstacle that prevents the next haul truck 140 from traveling from the staging area 107 to the originally planned load location 106. Accordingly, the supplemental planning system 66 may select a new or alternate load location 111 that may be reached by the bucket 17 of the hydraulic shovel 11 and is not blocked by the pile of material 125.

Upon selecting an alternate load location 111, the truck controller 51 may communicate the selected alternate load location to any or all of the shovel controller 31, the planning system 65, or a remote control system 121 through the wireless communications system 90. The shovel controller 31, the planning system 65, or the remote control system 121 may then either approve the proposed alternate load location 111 or suggest still a different alternate load location. If the proposed alternate load location 111 is accepted, the hydraulic shovel 11 may then proceed with a new material movement cycle.

If the proposed alternate load location 111 is not accepted and a further alternate load location has been proposed, one of the truck controller 51, the supplemental planning system 66 or the remote control system 121 may then either approve the proposed different alternate load location or suggest still another alternate load location. If the proposed different alternate load location is accepted, the hydraulic shovel 11 may then proceed with a new material movement cycle.

If the proposed different alternate load location is not accepted, one of the truck controller 51, the supplemental planning system 66 or the remote control system 121 may propose a further alternate load location and this process continued until either a new load location is selected or a threshold number of attempts at locating or re-selecting an alternate load location have been attempted without success. Upon exceeding the threshold number of re-selecting attempts, a cleanup request or alert may be generated by any of the controllers 31, 51, 122 to clean up the area adjacent the load locations and/or the hydraulic shovel 11. The cleanup request may be generated automatically by any of the systems (e.g., the shovel control system 30, the truck control system 50 or the remote control system 121) or any of the controllers (e.g., the shovel controller 31, the truck controller 51, or the remote controller 122) or manually by personnel monitoring the machines 10 or the systems.

Alternate configurations of the operation of the supplemental planning system 66 are contemplated. For example, rather than including the supplemental planning system 66 on the haul truck 40 as part of the truck control system 50, the supplemental planning system may form a portion of the planning system 65 at the shovel control system 30 or the remote control system 121. In such case, after identifying or specifying the desired original load location 106, the supplemental planning system 66 may receive data identifying or specifying the current location of the next haul truck 40 to be loaded and perception data from the perception sensors 56 identifying or locating any obstacles in the path between the current location of the haul truck and the original load location.

Still further, regardless of the location of the supplemental planning system 66, the perception data may originate or be generated by perception sensors on any of the hydraulic shovel 11, the haul truck 40, or a mobile machine such as an unmanned aerial vehicle 61.

Further, the process of locating alternate load locations may be repeated as piles of material define obstacles that prevent access to previously used alternate load locations. For example, referring to FIG. 1, if additional piles of material 126 are deposited in the path from the next haul truck 140 to the alternate load location 111 and they are sufficiently large, the piles of material may define an obstacle or obstacles that prevent the next haul truck from traveling from the staging area 107 to the alternate load location 111. In such case, the supplemental planning system 66 may select another new or alternate load location 112 that may be reached by the bucket 17 of the hydraulic shovel 11 and is not blocked by the pile of material 126. The process of approving the new alternate load location 112 may be repeated as described above with respect to alternate load location 111.

Although described with respect to the planning system 65 and the supplemental planning system 66 operating with the hydraulic shovel 11 and haul truck 40, the supplemental planning system disclosed herein may be used with other material moving operations. For example, after filling a material carrying machine such as the haul truck 40, the machine may move the material to another location at which it is dumped. Another machine such as a dozer (not shown) may then operate on the dumped material such as by spreading or otherwise moving the dumped material.

In such case, a system similar or identical to the planning system 65 may operate to determine a planned dump location for the material within the haul truck 40. However, as a result of an obstacle in the path of the haul truck, it may be difficult or impossible for the haul truck to reach the planned dump location. A supplemental planning system 66 may operate to identify or specify an alternate dump location in a manner similar to that described above with respect to the alternate load locations 111, 112. However, the supplemental planning system 66 may operate differently in that it may rely upon the operating characteristics and position of the other machine (e.g., the dozer) as well as the current and desired topography of the work site 100.

The original or planned load locations 106, the alternate load locations 111, 112, and the planned dump locations and alternate dump locations referred to in the example describing a haul truck 40 operating in conjunction with another machine such as a dozer are sometimes referred to herein as spot locations. For example, the planning system 65 may determine a target or spot location to which the bucket 17 and the haul truck 40 will both be positioned while simultaneously carrying out the dumping operation of the hydraulic shovel 11 and the loading operation of the haul truck. Similarly, the planning system 65 may determine a target or spot location to which the haul truck will be positioned while carrying out a dumping operation in proximity to another machine or operation. In each instance, if the haul truck 40 cannot reach the designated spot location as a result of an obstacle in the path, the supplemental planning system 66 may generate an alternate spot location at which the loading/dumping or dumping operations, respectively, may occur.

INDUSTRIAL APPLICABILITY

The industrial applicability of the systems described herein will be readily appreciated from the forgoing discussion. The foregoing discussion is applicable to systems used with loading machines such as the hydraulic shovel 11 and mobile machines such as haul trucks 40 that haul material at a work site 100. Such work sites may include a mining site, a landfill, a quarry, a construction site, a roadwork site, or any other area in which material is transported.

A planning system 65 may be used to establish dig locations 105 and load locations 106 when operating machines such as the hydraulic shovel 11 and haul trucks 40 at a work site 100 to move material. During such material moving operations, material may be displaced or fall onto the ground surface 101. Such material may create obstacles that impede or disrupt the movement of a haul truck 40 to a planned load location 106. Accordingly, a supplemental planning system 66 may be provided that operates to identify or specify an alternate load location 111.

Figure 5:
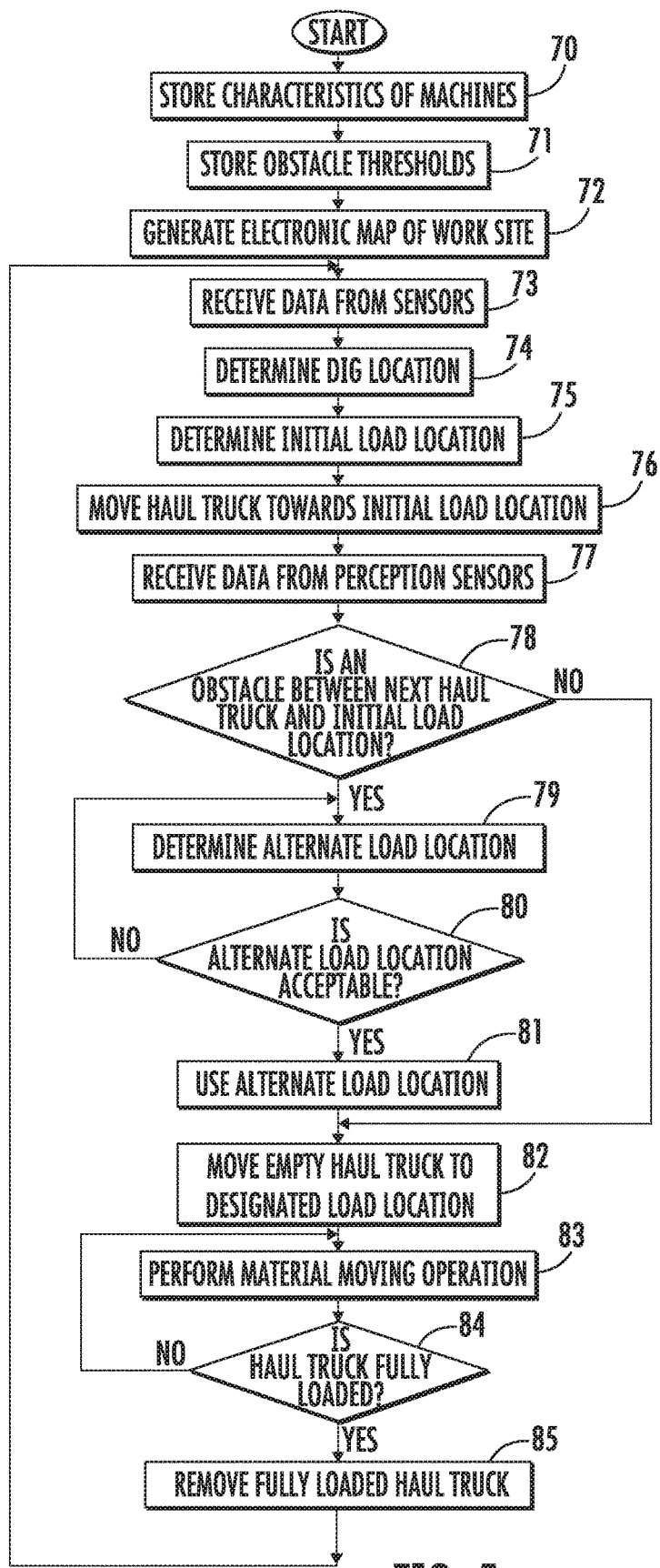
FIG. 5 depicts a flowchart illustrating a process for moving material according to the principles disclosed herein.

Referring to FIG. 5, a flowchart of the operation of an exemplary autonomous or semi-autonomous material movement process is depicted. At stage 70, the characteristics of the machines may be stored or accessed. The characteristics may include operating capacities, dimensions, and desired operating characteristics. Examples may include the kinematic model of the hydraulic shovel 11 and the dimensions including ground clearance and turning radius of the haul trucks 40. The obstacles thresholds may be stored or accessed at stage 71. In one example, an obstacle threshold may include a maximum height of an obstacle. In another example, an obstacle threshold may include a distance between a pair of obstacles together with a maximum height.

An electronic map of the work site 100 may be generated at stage 72. The electronic map may be generated in any desired manner. In one example, the electronic map may be generated using an unmanned aerial vehicle 61 such as is depicted in FIG. 1 with a perception system 60. At stage 73, data may be received from the sensors associated with each machine. Such data may include the position of the hydraulic shovel 11 as well as its implement system 12.

Using the position of the hydraulic shovel 11 and the implement system 12 as well as the electronic map of the work site 100, the planning system 65 may determine a dig location 105 at stage 74 and an initial load location 106 at stage 75. A path from the current position of the haul truck 40 (e.g., such as at the staging area 107) to the initial load location 106 may be planned and commands generated at stage 76 to move the haul truck towards the initial load location. In one embodiment, the planning process may be performed by the truck controller 51. As the haul truck 40 is moving towards the initial load location 106 based upon truck pose data from the truck pose sensor 53, the truck controller 51 may receive at stage 77 perception data from the perception sensors 56 of the haul truck.

At decision stage 78, the truck controller 51 may determine whether any obstacles exist between the current location of the haul truck 40 and the initial load location 106. To do so, the truck controller 51 may identify or locate piles of material and compare them to the obstacles thresholds to determine whether any of the piles of material constitute an obstacle. If no obstacles are present between the haul truck 40 and the initial load location 106, the haul truck may proceed to the initial load location where it is filled with material. More specifically, at stage 82, the empty haul truck 40 is moved to the initial load location 106. At stage 83, the hydraulic shovel 11 may perform a material moving operation to move material from the dig location 105 to the initial load location 106.

A determination may be made at decision stage 84 whether the haul truck 40 is full after each load of material is dumped into the haul truck. Such a determination may be made in any desired manner as would be understood by one skilled in the art. If the haul truck 40 is not full, stage 83 is repeated until the haul truck is full. If the haul truck 40 is full, a propulsion command may be generated to propel the fully loaded haul truck away from the initial load location 106 at stage 85 and stages 73-85 repeated.

If at decision stage 78 an obstacle is present between the haul truck 40 and the initial load location, the supplemental planning system 66 may determine at stage 79 an alternate load location 111. Such alternate load location 111 may be based upon the position and kinematics of the hydraulic shovel 11, the dig location 105, the position and operating characteristics of the haul truck 40, and the topography of the ground surface 101. In an embodiment, the alternate load location 111 may be determined by the truck controller 51.

After determining an alternate load location 111, the alternate load location may be transmitted to a location remote from the haul truck 40 such as the shovel controller 31 or the remote controller 122 for approval at decision stage 80. If the proposed alternate load location 111 is not approved, further alternate load locations may be generated and proposed by either the shovel controller 31, the truck controller 51, or the remote controller 122 until an acceptable alternate load location is approved. If an acceptable alternate load location cannot be reached, such as after a certain specified number of attempts, a cleanup request may be generated.

Once an alternate load location 111 is approved, the alternate load location may be used at stage 81 as the load location for the subsequent material movement process. More specifically, at stage 82, the empty haul truck 40 is moved to the alternate load location 111. At stage 83, the hydraulic shovel 11 may perform a material moving operation to move material from the dig location 105 to the alternate load location 111.

A determination may be made at decision stage 84 whether the haul truck 40 is full after each load of material is dumped into the haul truck. If the haul truck 40 is not full, stage 83 is repeated until the haul truck is full. If the haul truck 40 is full, a command may be generated to propel the fully loaded haul truck away from the alternate load location 111 at stage 85 and stages 73-85 repeated.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for changing a spot location while moving material from a first location to a second location at a work site, comprising:
   a ground engaging drive mechanism to propel a material carrying machine along a ground surface at the work site;
   a truck pose sensor configured to generate truck pose signals indicative of a pose of the material carrying machine;
   a perception sensor configured to generate perception signals indicative of an environment at the work site;
   a controller configured to:
   store an obstacle threshold for the material carrying machine;
   determine an initial spot location for the material carrying machine;
   determine a current pose of the material carrying machine based upon the truck pose signals;
   determine a path between the material carrying machine and the initial spot location based upon the current pose of the material carrying machine;
   determine a topography of the path between the material carrying machine and the initial spot location based upon the perception signals from the perception sensor, the topography locating at least one obstacle in the path;
   determine an alternate spot location if the at least one obstacle in the path between the material carrying machine and the initial spot location exceeds the obstacle threshold, the alternate spot location being based upon a position of the at least one obstacle; and
   generate a propulsion command to move the material carrying machine from the current pose to the alternate spot location.

2. The system of claim 1, wherein the obstacle threshold is a height of an obstacle.

3. The system of claim 1, wherein the obstacle threshold is a distance between a pair of obstacles.

4. The system of claim 1, further comprising:
an implement system of a loading machine at the work site having a linkage assembly including a material engaging work implement;
an implement system pose sensor configured to generate implement system pose signals indicative of a pose of a portion of the implement system;
the controller being further configured to:
store a kinematic model of the implement system;
determine a current pose of the portion of the implement system based upon the implement system pose signals; and
determine the initial spot location for the material carrying machine based upon the kinematic model and the current pose of the implement system.

5. The system of claim 4, wherein the alternate spot location is based upon the kinematic model of the implement system.

6. The system of claim 4, wherein the loading machine and the material carrying machine are each operated autonomously.

7. The system of claim 4, wherein the perception sensor is disposed on a movable machine spaced from the loading machine.

8. The system of claim 7, wherein the perception sensor is disposed on the movable machine remote from the material carrying machine.

9. The system of claim 1, wherein the perception sensor is disposed on the material carrying machine.

10. The system of claim 1, further including a rotatable platform having the linkage assembly mounted thereon, the linkage assembly including a boom member operatively connected to the rotatable platform, a connecting member operatively connected to the boom member and the material engaging work implement.

11. The system of claim 1, wherein the material carrying machine includes a truck controller, and the alternate spot location is determined by the truck controller.

12. The system of claim 11, wherein the alternate spot location is approved by a controller remote from the material carrying machine.

13. The system of claim 12, wherein the controller remote from the material carrying machine is a loading machine controller of a loading machine configured to load material on the material carrying machine.

14. The system of claim 1, wherein the material carrying machine includes a truck controller, and a first alternate spot location is determined by the truck controller, and a second alternate spot location is determined by a controller remote from the material carrying machine, and the propulsion command moves the material carrying machine to the second alternate spot location.

15. The system of claim 1, wherein the controller is further configured to generate a cleanup request based upon a topography of the at least one obstacle in the path.

16. The system of claim 1, wherein the controller is further configured to direct an alternate material carrying machine to the alternate spot location based upon a topography of the at least one obstacle in the path.

17. A method of changing a spot location while moving material at a work site from a first location to a second location, comprising:
storing an obstacle threshold for a material carrying machine;
determining an initial spot location for the material carrying machine;
determining a current pose of the material carrying machine based upon truck pose signals from a truck pose sensor;
determining a path between the material carrying machine and the initial spot location based upon the current pose of the material carrying machine;
determining a topography of the path between the material carrying machine and the initial load location based upon perception signals from a perception sensor, the topography locating at least one obstacle in the path;
determining an alternate spot location if the at least one obstacle in the path between the material carrying machine and the initial spot location exceeds the obstacle threshold, the alternate spot location being based upon a position of the at least one obstacle; and
generating a propulsion command to move the material carrying machine from the current pose to the alternate spot location.

18. The method of claim 17, further comprising determining the alternate spot location by a truck controller on the material carrying machine.

19. The method of claim 17, further comprising:
storing a kinematic model of an implement system;
determining a current pose of a portion of the implement system based upon implement system pose signals from an implement system pose sensor associated with the implement system; and
determining the initial spot location for the material carrying machine based upon the kinematic model and the current pose of the implement system.

20. The method of claim 19, further comprising operating autonomously each of the implement system and the material carrying machine.

* * * * *